Oct. 27, 1942. W. T. DUNN 2,299,883
FLUID COUPLING
Filed Dec. 30, 1938
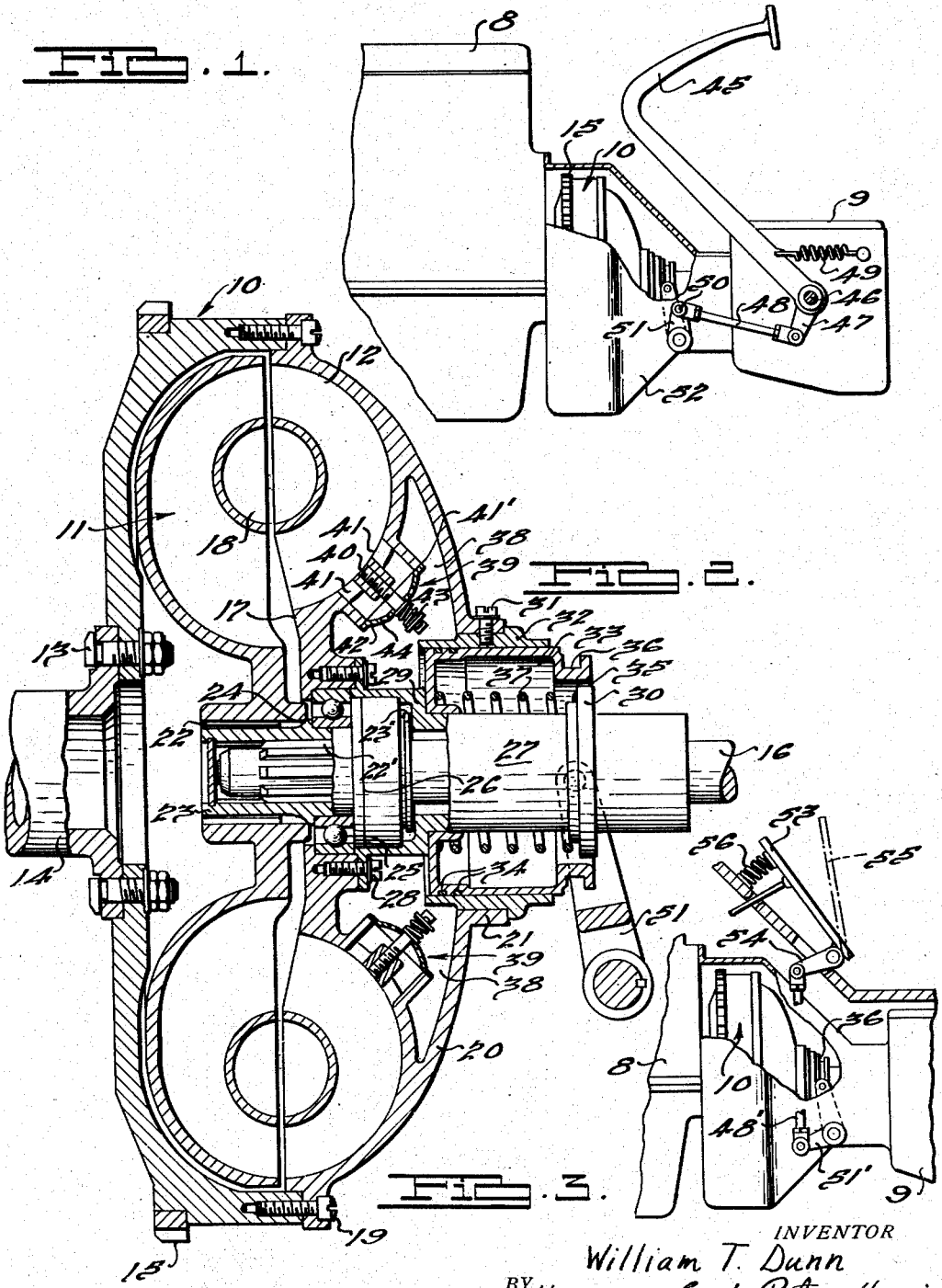
INVENTOR
William T. Dunn
BY Hamess, Lind, Patel & Harris
ATTORNEYS Patented Oct. 27, 1942

2,299,883

UNITED STATES PATENT OFFICE 2,299,883

FLUID COUPLING

William T. Dunn, Detroit, Mich., assignor to Chrysler Corporation, Highland Park, Mich., a corporation of Delaware Application December 30, 1938, Serial No. 248,369

8 Claims. (Cl. 60—54)

This invention relates to power transmission mechanism.

It pertains particularly to power transmission mechanism in which a fluid coupling of the kinetic type is used to transmit engine power to the driving wheels of a motor vehicle.

Heretofore, in motor vehicle power transmission systems employing fluid couplings, difficulty has been experienced by reason of the tendency of the vehicle to "creep" or drive slowly during idling of the engine with the transmission in gear. In other words, it was necessary in bringing the vehicle to rest, to manipulate the transmission into neutral, or apply the usual brakes, to oppose the drive or drag transmitted through the fluid coupling at engine idling speed.

It is an object of the invention to materially reduce the aforesaid difficulties by the provision of a comparatively large capacity evacuation chamber included within the fluid coupling as a unitary part thereof.

Another object of the invention is to provide an improved fluid coupling having a fluid evacuation chamber of relatively great capacity carried by the coupling impeller, or driving member, and which is so constructed and arranged as to preserve the compactness of the coupling assembly and maintain a comparatively small over-all length thereof.

By so providing a fluid coupling having its fluid evacuation chamber fixed to the coupling impeller, or fixed to the coupling runner if desired, and constituting a permanent part of the fluid coupling, balancing operations of the coupling are facilitated inasmuch as the rotative part of the coupling can be satisfactorily balanced as a unit, and the coupling then installed in the motor vehicle.

Another object of the invention is to provide in a fluid coupling of this type, automatically operable means for accommodating a rise in the fluid pressure in the working chamber thereof to thereby prevent loss of fluid due to heating of the fluid.

A further object of the invention is to provide in a fluid coupling of this type, a means for adjustably controlling the degree of evacuation desired for driving the vehicle under varying conditions.

A still further object is to provide in such a coupling, automatically actuated means for returning the evacuated fluid to the working chamber of the coupling at a predetermined rate, to effect smooth acceleration of the vehicle.

Further objects and advantages of the invention will be apparent from the following detailed description of one embodiment thereof, reference being had to the accompanying drawing, in which:

Fig. 1 is a partial side elevational view of a motor vehicle drive mechanism illustrating one embodiment of the invention.

Fig. 2 is a central, vertical, sectional view of the fluid coupling used in the mechanism shown in Fig. 1.

Fig. 3 is a partial side elevational view corresponding to Fig. 1, but illustrating a modification thereof.

In the form of the invention illustrated in the drawing, the improved fluid coupling is interposed between a vehicle engine 8 and a speed change transmission 9, and comprises driving and driven portions generally indicated by the numerals 10 and 11 respectively. The driving portion 10 comprises an impeller rotor structure 12 which is drivingly connected as by bolts 13 to the crankshaft 14 of the engine 8. Starter teeth 15 are preferably carried by the driving member 10 and are adapted to be engaged by the usual engine starting device.

The driven or runner rotor member 11 is drivingly connected to a driven shaft 16 which corresponds to the driving shaft which ordinarily connects the clutch of a vehicle to the transmission mechanism thereof.

In the impeller and runner rotor structures 12 and 11 respectively a plurality of fluid passages are provided through which the working fluid circulates as is well known in the art. An annular vortex chamber 18 is shown in the drawing, but this may be omitted without substantially affecting the operation of the drive.

A raised lip or baffle 17 is provided on the impeller 12 for the purpose of disrupting the flow of fluid at low speeds of rotation thereby increasing the slip between the impeller and runner with consequent lowering of the energy transmitted by the former. It has been found that the baffle 17 has practically no effect upon the operation of the coupling at intermediate speeds and no effect whatsoever at high speeds, because the fluid tends to circulate in a path located outwardly of the baffle 17 when the speed of rotation of the impeller increases above the idling speed of the motor.

The fluid pressure generating portion of the impeller 12 is connected to the flywheel portion 10 by means of bolts 19 and has formed integrally therewith an outer cover housing 20 which has a rearwardly extending flange 21.

The runner 11 is drivingly connected to the output shaft 16 through the intermediary of the sleeve 23 which is provided with external splines 22 and internal splines 22'. Formed on the sleeve 23 is an annular flange 24 which acts as a forward stop for the anti-friction bearing designated generally as 25. The bearing 25 is, of course, necessary to accommodate the relative rotation between the impeller and the runner. A suitable fluid seal 26 is provided to prevent escape of the fluid rearwardly along the sleeve 23.

A rearwardly extending sleeve 27 is journalled on the shaft 16 and has an enlarged forward portion 29 which is provided with an integral flange, by means of which the sleeve is fixed to the impeller structure by the bolts 28.

As is apparent from Fig. 2, portion 29 of sleeve 27 is provided with an internal shoulder which engages the rear face of seal 26, and fits snugly against the outer race of bearing 25, thereby retaining these parts in place. A snap ring 23' fits in a groove around the rear end of the sleeve 23 and prevents said sleeve from forward displacement.

The housing 20 has an open-end cylindrical member 32 secured thereto by fastening means 31. A piston 33 is mounted within said cylinder for sliding movement relatively to said cylinder and to the sleeve 27. Piston rings 34 are provided to assist in maintaining a fluid-tight assembly.

The piston 33 is provided at its rearward end with a channeled collar portion 36 which is adapted to receive a control member as will hereinafter be described. The enlarged end portion 29 of sleeve 27 affords a forward stop for the slidable piston 33, and a coiled compression spring 37 is interposed between the piston and the flange 30 of sleeve 27 to yieldingly urge the piston against the shoulder 29.

Between the housing 20 and the inner dished portion of the impeller structure 12 is formed an annular fluid chamber 38 which is in communication with the interior of the cylinder 32. A plurality of valves 39 are carried by the inner portion of the impeller structure and are spaced symmetrically around the circumference thereof. These valves 39 control the passage of fluid from the working passages of the coupling to the chamber 38 and vice-versa.

Each of the valves 39 comprises a pin 40 which has a threaded engagement with the dished portion of the impeller structure and which protrudes into the chamber 38 preferably in the general direction of the cylinder and piston assembly just described. A plurality of ports 41 are arranged circumferentially about the pin 40 which communicate with the chamber 38 and the working passages of the impeller. A valve plate 42 is slidably mounted on the pin 40 and is yieldingly urged by the coiled spring 43 to seat upon the outer annular seat 41'. The plate 42 has a plurality of annularly arranged ports 44 of smaller area than the ports 41 which communicate with the chamber 38.

A suitable remote control, such as a pedal 45 (see Fig. 1) is provided to control the sliding movement of the piston 33. The pedal 45 is preferably mounted in the automobile in the same location as the conventional clutch pedal for operation by the left foot of the operator, although it may have other locations if desired.

The pedal 45 is pivotally mounted at 46 on the transmission casing and has a bell-crank portion 47 pivotally connected to a forwardly extending adjustable link 48; a yielding means such as the spring 49 being interposed between the pedal and the casing of the transmission 9 to yieldingly return the pedal to its normal illustrated position. The forward end portion of the link 48 is pivotally connected at 50 to one arm of a bell-crank 51 mounted on the housing 52. The other arm of the bell-crank 51 extends within the housing 52 and into engagement with the shifter groove 36 of the piston 33, as shown in Fig. 2.

When pedal 45 is in the position illustrated in Fig. 1, piston 33 is in its forward position as shown in Fig. 2. It is thus obvious that the vehicle operator may move the piston 33 to rear (or right hand end as viewed in Fig. 2) of the cylinder 32 by fully depressing the pedal.

In the normal operation of the device, the coupling is filled with fluid to about three-fourths of its capacity, the fluid medium being oil, water or other suitable substance. When the engine crankshaft 14 is rotating the fluid circulates through the passages 11 and 12 of the runner and impeller respectively in the manner well known in the art and the runner is driven by the circulation of pressure fluid from the impeller. When the engine is idling the pressure of the circulating fluid is, of course, low and the energy transmitted from the impeller to the runner is also low, consequently there is a great amount of slippage between the coupler elements. It has been found however, that enough energy is transmitted to slowly drive the vehicle, if the transmission is in gear, and to cause severe clashing of the gears when changing speeds. In this embodiment of the invention rotation of the runner may be entirely stopped at the will of the operator by fully depressing the pedal 45 which thereupon moves the piston 33 to the right, as shown in Fig. 2, through the intermediary of the linkage 47, 48, 50 and 51. This movement of the piston creates a vacuum in the chamber 38 which causes the valve elements 42 to unseat, thereby allowing the fluid in the passages 11 and 12 to be drawn into the chamber 38 at a rapid rate due to the relatively large increase in volume of the chamber. The withdrawal of fluid from the working portion of the coupling results in a sharp reduction in the torque and/or energy transmitted to the runner and allows the transmission gears to be shifted or the vehicle to remain at rest with the transmission in driving position.

When the operator desires to drive the vehicle, he releases the pedal 45 which allows the piston 33 to be returned to the forward position (as shown in Fig. 2) under the influence of the spring 37. The initial movement of the piston produces a reversal of pressure in the chamber 38 and causes the valve elements 42 to seat thereby cutting off the direct passage of fluid through ports 41 and causing the fluid to return to the working passages through the small ports 44 which allows a gradual decrease in slip between elements 11 and 12 with consequent gradual build-up of torque in the unit resulting in smooth acceleration of the vehicle.

It is apparent from the above description that the transmission of torque from the impeller to the runner may be interrupted at any time, at the will of the operator, simply by depressing the pedal 45. Another advantage of the arrangement lies in the fact that variation in the slip between the coupling elements may be obtained by partially depressing the foot pedal, such an operation sometimes being desirable when it is desired to proceed at an extremely slow rate of speed while remaining in high gear.

Fig. 3 shows an embodiment of the invention that differs from that previously described in that the pedal 45 has been eliminated, its function being performed by the vehicle accelerator pedal. In the figure, the accelerator pedal 53, which is pivotally mounted near its lower end on the floor board of the vehicle, has a bell-crank arm 54 rigidly mounted for movement therewith. An adjustable link 48' connects arm 54 with one arm of a second bell-crank 51', the other arm of which has a connection with the shifter portion 36 of the piston 33 in a manner similar to that shown in Fig. 2. The spring 56 corresponds to the conventional return spring that is standard on motor cars, but it may be made somewhat stiffer if necessary to assure positive action of the piston 33. When the pedal 53 is in its illustrated dotted line position 55, the piston 33 will be withdrawn to its rearmost position in cylinder 32 and there will be a minimum volume of fluid in the working passages of the coupling. This is the normal position of the parts when the operator desires to stop the vehicle or while shifting gears. When the operator desires to accelerate the vehicle, he depresses the accelerator, as in normal vehicle operation, and the spring 37 slowly forces the piston 33 forwardly in the cylinder 32 thereby forcing the fluid back into the working passages of the coupling and effecting smooth acceleration as has previously been described. The linkage 48', 51', 54 is so proportioned that the piston 33 may be free to return to its extreme forward position after only a slight depression of the pedal 53, and further depression of the pedal will have no substantial effect on the piston.

The improved mechanism just described also provides automatically operable means for accommodating a rise in fluid pressure in the working chamber. In conventional fluid couplings operated under conditions requiring a high percentage of slip for sustained periods, the fluid in the working chamber becomes heated causing the trapped air to expand with consequent rise in pressure. Under extreme conditions, the pressure may become high enough to force fluid past the fluid seals and out of the coupling. This danger is absent in the present improved coupling, because the piston 33 will move toward the rear of cylinder 32 to accommodate any increase in the pressure of the fluid in the coupling sufficient to overcome the combined pressures of springs 37 and 49 (or 37 and 56 in the modification shown in Fig. 3). If it is desired to accommodate even slight increases in the fluid pressure, a lost motion connection may be incorporated in the operating linkage between the pedal and bell-crank lever 51 making it necessary for the pressure of spring 37 only to be overcome before permitting an increase in the volume of the storage chamber 38.

The improved fluid coupling just described provides a mechanism which is inexpensive, compact enough to be substituted in a vehicle in place of the conventional friction clutch, and which is easily placed and maintained in balance.

It is obvious that various modifications may be made in the above described apparatus without departing from the scope of the invention as set forth in the appended claims.

I claim:

1. In a fluid coupling, a driving element, a driven element, a fluid circulating chamber enclosed by said elements, a fluid storage chamber carried by said driving member, passages connecting said chambers, cap members seated over said passages to normally restrict the flow of fluid between said chambers and suction means for unseating said cap members.

2. In a fluid coupling, a driving element, a driven element, a fluid circulating chamber enclosed by said elements, a fluid storage chamber carried by said driving element, passages connecting said chambers, cap members seated over said passages to normally restrict the flow of fluid between said chambers, means responsive to a drop in pressure in said storage chamber for unseating said cap members, and means for varying the pressure in said storage chamber.

3. In a fluid coupling having a driving element and a driven element which together enclose a fluid circulating chamber, a fluid storage chamber carried by one of said members, a passage connecting said chambers, a cap member adapted to be seated over said passage to normally restrict flow of fluid between said chambers, and means for creating suction in said storage chamber to thereby unseat said cap member and induce a flow of fluid from said circulating chamber into said storage chamber.

4. In a fluid coupling having a driving element and a driven element which together enclose a fluid circulating chamber, a fluid storage chamber carried by one of said members, a passage connecting said chambers, a cap member adapted to be seated over said passage to normally restrict flow of fluid between said chambers, and means for creating suction in said storage chamber to thereby unseat said cap member and induce a flow of fluid from said circulating chamber into said storage chamber, said means comprising a cylinder disposed concentrically about the axis of said coupling in communication with said storage chamber, a piston slidably disposed in said cylinder, and means for sliding said piston.

5. In a fluid coupling having a driving element and a driven element which together enclose a fluid circulating chamber, a fluid storage chamber carried by one of said members, a plurality of passages connecting said chambers, said passages being circumferentially disposed around and closely adjacent to the axis of said coupling, cap members adapted to be seated over said passages, springs for normally seating said cap members, and means for creating suction in said storage chamber to thereby unseat said cap members and induce flow of fluid from said circulating chamber into said storage chamber.

6. In a motor vehicle having a driving shaft adapted to be driven by the motor thereof and a driven shaft adapted to drive the vehicle, a transmission mechanism for drivingly connecting said shafts including a fluid coupling having a fluid working chamber therein; a throttle control member for controlling said motor; means for evacuating fluid from said working chamber, and control means for said evacuating means including linkage connected with said throttle control member operable in response to throttle closing movement of said control member to cause said evacuating means to evacuate fluid from said working chamber, and operable in response to initial throttle opening movement of said control member for gradually returning the evacuated fluid to said working chamber.

7. In a vehicle having a driven member, an engine, and a transmission including a fluid coupling for drivingly connecting said engine and said driven member, a fluid working chamber in said coupling; a fluid storage chamber carried by said coupling for rotation therewith; passages interconnecting said chambers; valve members in said passages for regulating the flow of fluid through said passages; a driver operable control member on said vehicle having means operably associated therewith for inducing flow of fluid between said chambers; said valves being cooperably associated with said last means in such manner that rapid evacuation of the coupling working chamber is effected upon actuation of said control member in one direction and relatively slow filling of said chamber is effected upon reverse actuation of said control member.

8. In a vehicle having a driven member, an engine, and a transmission for drivingly connecting said engine and said driven member including a fluid coupling, driving and driven members in said coupling; means operable independently of the speed of said members for controlling the slip between said members; a throttle control member for controlling said engine; means for actuating said slip controlling means in response to operation of said throttle control member whereby the slip in said coupling is caused to decrease upon throttle opening movement of said throttle control member and to increase upon throttle closing movement of said throttle control member, and means operably associated with said slip controlling means for regulating the operation thereof in response to throttle opening operation of said throttle control member as aforesaid in such manner that the slip in said coupling is caused to decrease at a predetermined rate.

WILLIAM T. DUNN.